UNITED STATES PATENT OFFICE.

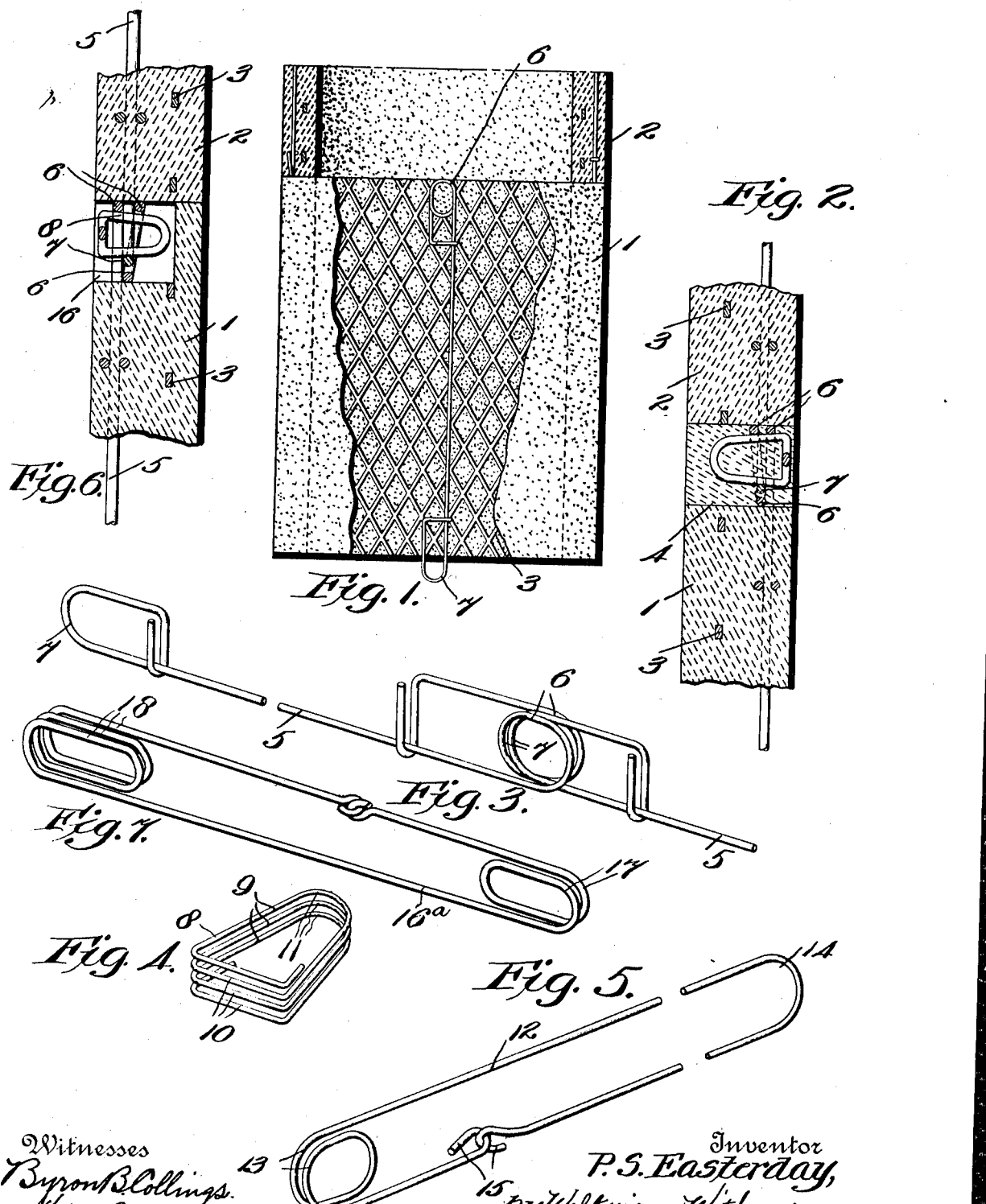
P. S. EASTERDAY.
COUPLING FOR REINFORCED CONCRETE CONDUIT SECTIONS.
APPLICATION FILED JAN. 27, 1913.
1,061,665. Patented May 13, 1913.

PHILIP S. EASTERDAY, OF PORTLAND, OREGON.

COUPLING FOR REINFORCED-CONCRETE CONDUIT-SECTIONS.

1,061,665. Specification of Letters Patent. Patented May 13, 1913.

Application filed January 27, 1913. Serial No. 744,564.

*To all whom it may concern:*

Be it known that I, PHILIP S. EASTERDAY, a citizen of the United States, residing at Portland, in the county of Multnomah and State of Oregon, have invented certain new and useful Improvements in Couplings for Reinforced-Concrete Conduit-Sections; and I do hereby declare the following to be a full, clear, and exact description of the invention, such as will enable others skilled in the art to which it appertains to make and use the same.

My invention relates to an improved coupling for reinforced-concrete conduit sections, and it consists in the constructions and arrangements herein described and claimed.

An object of my invention is to provide an improved construction by which a series of reinforced-concrete conduit sections can be elastically connected together to provide a strong and durable continuous fluid conduit.

A further object of my invention is to provide an improved elastic coupling for reinforced-concrete conduit sections, adapted to firmly maintain a tight joint between the abutting conduit ends under all normal conditions, while providing sufficient elasticity to prevent the occurrence of excessive rupturing strains in the body of the concrete sections upon settling or shifting of the surrounding earth or other supports.

A further object of my invention is to provide an improved means for elastically connecting a series of reinforced-concrete conduit sections tightly end to end, adapted to distribute all abnormal strains over several of the adjacent elastic connections; thereby avoiding undue opening of the joint between the abutting ends of said sections and preventing the injurious localization of strains on said concrete sections.

In the accompanying drawings forming a part of this application, and in which similar reference symbols indicate corresponding parts in the several views:—Figure 1 shows two abutting conduit sections of reinforced concrete, with my invention applied thereto; the upper section being shown in vertical section, and the concrete body of the lower section being partly broken away; Fig. 2 is an enlarged detail section on an axial plane of the connected conduit sections, showing the arrangement of my improved elastic coupling; Fig. 3 is a perspective view of one of the connecting rods shown in Figs. 1 and 2, with its coils engaging the loop of an adjacent connecting rod; Fig. 4 is a perspective view of my improved elastic locking pin; Fig. 5 is a perspective view, illustrating a slightly preferred form of the connecting rod; Fig. 6 is a view similar to Fig. 2, illustrating a modification in which the conduit sections are provided with peripheral recesses instead of slots; and Fig. 7 is a further modification.

Referring to the drawings, 1 and 2 indicate concrete conduit sections reinforced in any suitable manner, as by sheets of expanded metal 3 embedded therein, and having series of slots 4 in one end thereof.

A series of connecting rods 5 are embedded in each conduit section and are formed at one end with a pair of axially-spaced coils 6 positioned within said slots 4; the other ends of said rods 5 being provided with loops 7 projecting beyond the end of the conduit section for engaging between said coils 6 of an abutting section.

A compressible elastic locking pin 8 is formed of a resilient rod wound spirally to provide a coaxial series of coils 9 of tapered, or triangular form, having flat bases 10 and rounded apexes 11; said elastic pin being adapted to be driven, or tightly forced, in the engaged rod coils and loops of the abutting conduit sections for locking the latter together to firmly maintain tight joints between the abutting ends thereof.

In the use of my above described improved construction, the tightly driven elastic spring pins 8 will be further compressed by the engaged rod coils 6 and loops 7 upon strains exerted on the conduit by settling of the surrounding earth or other causes. During such compression of the locking pins 8 by abnormal strains, the curvature of the round apexes 11 of the several tapered spring coils thereof will be rapidly shortened, thereby greatly increasing the resistance to compression of said coils; such rapid increase in the resistance to compression causing abnormal strains to be transmitted through the connecting rods 5 and distributed to the elastic couplings of the adjacent concrete sections. This novel action is of great practical advantage in avoiding undue opening of the joints between the abutting sections and preventing injurious localization of strains in the latter.

Fig. 5 illustrates a preferred form in which a connecting rod 12 is bent to provide coils 13 and a loop 14 at its respective ends; the free ends of said rod being strongly connected at 15 in any suitable way.

Fig. 6 illustrates a modification in which one end of each section is provided with peripheral recesses 16 instead of the slots 4 previously described. This provides a construction in which no filling of concrete, or other impervious material, is required in the recesses 16, thereby leaving the interior of the coiled spring locking pins free from filling.

Fig. 7 illustrates a modification, in which a connecting rod 16ª is bent to provide two coaxial coils 17 at one end and three coaxial coils 18 at the other end; said two coils being adapted to fit between the three coils of the connecting rod of an adjacent section, and to be locked in position by a key as previously described.

My invention provides a very strong and advantageous construction which can be manufactured at a very low cost, and which is adapted for use equally well with either round bars, or with any of the patented bars on the market.

I have illustrated and described preferred and satisfactory constructions, but changes could be made within the spirit and scope of my invention.

I claim:—

1. An elastic coupling for reinforced-concrete conduit sections comprising rods provided at their respective ends with loops and coils, and a spring pin comprising a coaxial series of tapered coils adapted to be tightly forced within the coöperating rod loops and coils of abutting conduit sections.

2. A reinforced-concrete conduit section provided at one end with peripheral recesses, rods embedded in said concrete section and formed with coils lying within such recesses, loops on said rods projecting from the ends of said concrete section, and spring pins formed of coaxial series of tapered coils adapted to be tightly forced within said rod coils and loops of abutting conduit sections.

In testimony whereof, I affix my signature, in presence of two witnesses.

PHILIP S. EASTERDAY.

Witnesses:
E. ANDERSON,
ARTHUR P. TIFFT.